US009346689B2

(12) United States Patent
Hellenbrand et al.

(10) Patent No.: US 9,346,689 B2
(45) Date of Patent: May 24, 2016

(54) METHOD OF WATER DISCHARGE MANAGEMENT

(75) Inventors: Jeffrey J. Hellenbrand, Prairie du Sac, WI (US); Edward T. Maas, Poynette, WI (US); Jill E. McDonald, Madison, WI (US); John P. Fetzer, Lake Mills, WI (US)

(73) Assignee: Hellenbrand, Inc., Waunakee, WI (US)

( * ) Notice: Subject to any disclaimer, the term of this patent is extended or adjusted under 35 U.S.C. 154(b) by 1047 days.

(21) Appl. No.: 12/976,232

(22) Filed: Dec. 22, 2010

(65) Prior Publication Data

US 2011/0147315 A1    Jun. 23, 2011

Related U.S. Application Data

(60) Provisional application No. 61/288,978, filed on Dec. 22, 2009.

(51) Int. Cl.
*C02F 1/00*   (2006.01)
*B01D 15/00*   (2006.01)
(Continued)

(52) U.S. Cl.
CPC ............... *C02F 1/42* (2013.01); *B01D 24/383* (2013.01); *B01D 24/46* (2013.01); *B01D 24/4642* (2013.01); *B01D 24/4853* (2013.01); *C02F 1/001* (2013.01); *C02F 1/006* (2013.01); *C02F 1/008* (2013.01); *C02F 1/66* (2013.01); *C02F 5/00* (2013.01); *C02F 2001/425* (2013.01); *C02F 2209/055* (2013.01); *C02F 2303/16* (2013.01);
(Continued)

(58) Field of Classification Search
None
See application file for complete search history.

(56) References Cited

U.S. PATENT DOCUMENTS 1,625,198 A   10/1925   Eisenhauer
1,740,540 A   12/1929   Eisenhauer
(Continued)

OTHER PUBLICATIONS

Oasis Design, Grey Water Information Central, www.oasisdesign.net/greywater/, Nov. 15, 2010.
(Continued)

*Primary Examiner* — Nam Nguyen
*Assistant Examiner* — Richard Gurtowski
(74) *Attorney, Agent, or Firm* — Boardman & Clark LLP

(57) ABSTRACT

A method of water discharge management in a water processing system is provided. The method includes providing a supply of a first solution, providing a supply of a second solution, and selectively supplying the first solution to a water processing system and the second solution to the water processing system. The method further includes controllably and selectively directing discharge water formed in the water processing system through a first multi-way valve to a waste outlet during a period in which the discharge water satisfies a first selected criteria, and to a second multi-way valve during a period in which the discharge water satisfies a second selected criteria. The method also includes controllably and selectively directing the discharge water through the second multi-way valve to a first storage container connected to the second multi-way valve during a period in which the discharge water satisfies a third selected criteria, and to a third multi-way valve during a period in which the discharge water satisfies a fourth selected criteria. In addition, the method includes controllably and selectively directing the discharge water through the third multi-way valve to a second storage container during a period in which the discharge water satisfies a fifth selected criteria, and the discharge water as a solution to the supply of first solution during a period in which the discharge water satisfies a sixth selected criteria.

19 Claims, 6 Drawing Sheets

(51) Int. Cl.
  *F16K 11/065* (2006.01)
  *C02F 1/42* (2006.01)
  *B01D 24/48* (2006.01)
  *B01D 24/46* (2006.01)
  *C02F 5/00* (2006.01)
  *B01D 24/38* (2006.01)
  *C02F 1/66* (2006.01)

(52) U.S. Cl.
  CPC ......... *Y02W 10/37* (2015.05); *Y10T 137/86493* (2015.04)

(56) References Cited

U.S. PATENT DOCUMENTS

| | | | |
|---|---|---|---|
| 2,067,808 A | 6/1933 | Zimmerman et al. | |
| 2,065,962 A | 12/1936 | Bowers | |
| 2,099,287 A | 11/1937 | Woods | |
| 2,209,487 A | 7/1940 | Wagner | |
| 2,217,822 A | 10/1940 | Symons | |
| 2,315,223 A | 3/1943 | Riche | |
| 2,538,418 A | 1/1951 | Hughes | |
| 3,220,552 A | 11/1965 | Staats | |
| 3,574,559 A | 4/1971 | Kryzer et al. | |
| 3,580,615 A * | 5/1971 | Prosser | 285/81 |
| 3,680,703 A | 8/1972 | Borochaner | |
| 3,768,649 A | 10/1973 | Fleckenstein | |
| 3,899,421 A | 8/1975 | Keilin et al. | |
| 4,332,040 A * | 6/1982 | Palmer | 4/300 |
| 5,069,779 A * | 12/1991 | Brown | C02F 1/42 210/143 |
| 5,096,596 A | 3/1992 | Hellenbrand et al. | |
| 5,351,199 A * | 9/1994 | Ticcioni | C02F 1/42 700/282 |
| 5,908,549 A | 6/1999 | Wigen | |
| 6,098,646 A | 8/2000 | Hennemann et al. | |
| 6,482,325 B1 * | 11/2002 | Corlett et al. | 210/662 |
| 6,684,754 B2 | 2/2004 | Comer | |
| 6,790,362 B2 * | 9/2004 | FitzGerald | B01J 49/0095 210/103 |
| 7,156,995 B2 | 1/2007 | Maas et al. | |
| 7,638,063 B1 | 12/2009 | Maas et al. | |
| 2002/0195403 A1 * | 12/2002 | Takeda | B01J 49/0086 210/749 |
| 2005/0000902 A1 | 1/2005 | Newenhizen et al. | |
| 2005/0103722 A1 * | 5/2005 | Freydina et al. | B01D 61/46 210/746 |
| 2005/0109703 A1 | 5/2005 | Newenhizen | |
| 2007/0273868 A1 * | 11/2007 | Yano et al. | 356/36 |
| 2008/0237060 A1 | 10/2008 | Hegel et al. | |

OTHER PUBLICATIONS

Wikipedia, Drinking Water, en.wikipedia.org/wiki/drinking_water, Nov. 15, 2010.

Homestuffworks, How Does a Water Softener Work?, home.howstuffworks.com/question99,htm/printable, Nov. 15, 2010.

* cited by examiner

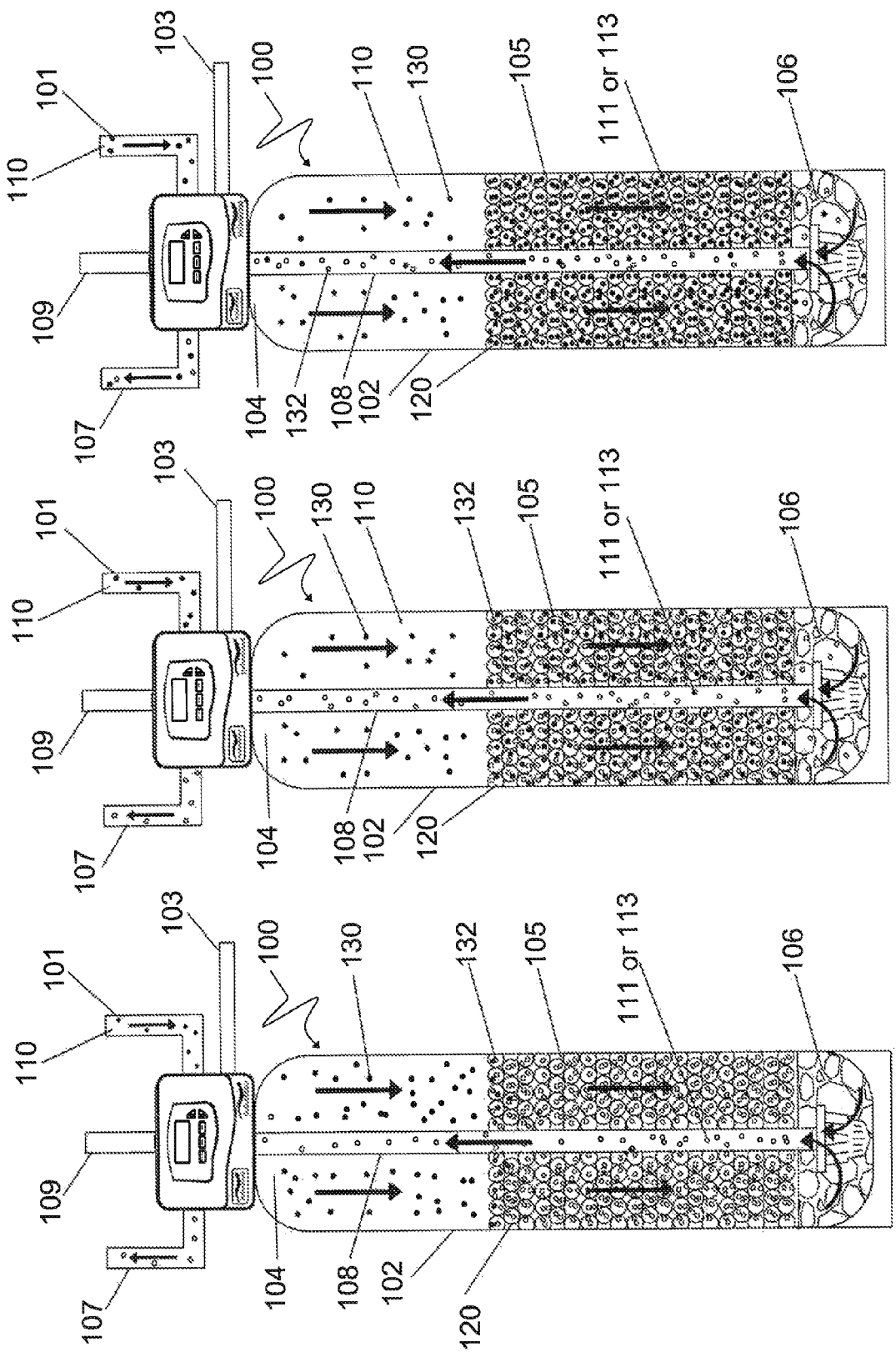

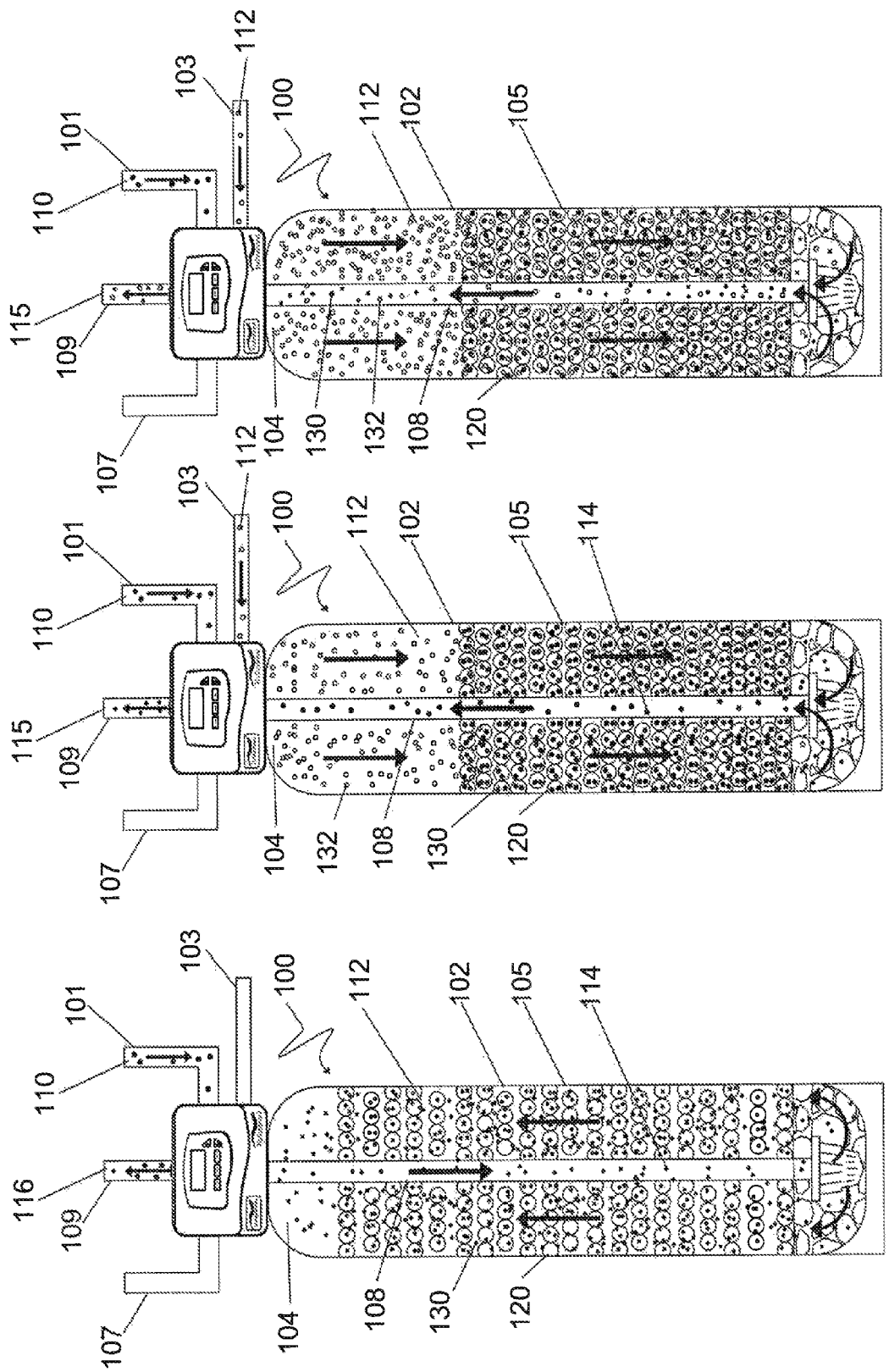

ically, the end user will need to purchase sodium salt blocks, solar salt and/or pellets that are used to generate the salt water or brine solution used during the above-outlined regeneration cycle. Similar expenses and cycles occur in other ion exchange and filter systems.

METHOD OF WATER DISCHARGE MANAGEMENT

CROSS-REFERENCE TO RELATED APPLICATIONS

This application claims the benefit of and priority to U.S. Provisional Patent Application, Ser. No. 61/288,978, filed Dec. 22, 2009, entitled "Systems, Methods and Apparatus for Automatic Water Management of Water Softener Discharge Water", the entire contents of which is hereby incorporated by reference in its entirety.

FIELD OF THE INVENTION

This invention relates to automatic water management.

BACKGROUND

It is known to process or treat water for a variety of purposes. Common water processing mechanisms are known, examples of which are ion exchange systems and filtration systems, or more specifically, cation exchange systems and dealkalizers, as well as carbon or chlorine filters and particulate filters. For instance, in areas where water supplied from a well or a utility main line is particularly hard (e.g., has a high quantity of hard water ions, such as calcium or magnesium ions), it may be desirable to soften the water by removing the hard water ions (e.g., calcium and magnesium ions) and replacing them with soft water ions (e.g., sodium ions), often through the use of a cation exchange water softener.

One type of traditional cation exchange water softener utilizes resin beads that are saturated with soft water ions. The hard water is passed over or around the resin beads, allowing the soft water ions to replace the hard water ions in the water. That is, the hard water ions will have become bound to the resin beads, while the soft water ions have been released from the resin beads and dispersed into the water. Eventually, the resin beads become saturated with hard water ions, i.e., most of the soft water ions associated with the resin beads have been exchanged for hard water ions. As the number of soft water ions associated with the resin beads decreases, with the resin beads becoming saturated with hard water ions, the resin beads become less effective at removing (e.g., stripping) the hard water ions from the water and replacing them with soft water ions.

Similar analogies can be made to other ion exchange and filtering devices for water. A regeneration process is periodically applied to the resin beads to remove the accumulated hard water ions from the resin beads and to resupply the resin beads with soft water ions. During the regeneration process, the hard water ions are stripped from the resin beads and soft water ions are again bound to the resin beads. A known method of regenerating the resin beads is to pass a saturated salt water (brine) solution (e.g., water that is saturated with soft water ions) over/around the resin beads. The soft water ions in the brine solution displace the hard water ions on the resin beads and become associated with the resin beads. The freed hard water ions are then discharged with the remaining salt water/brine solution from a drain outlet of the water softener into the building's wastewater system.

The above-outlined examples of a regeneration cycle for a cation exchange water softener, while necessary for the proper maintenance and operation of the example cation exchange water softener, may generate significant maintenance expenses for an end user of the example cation exchange water softener. One such expense is the periodic replacement of a source of soft water ions. Typically, the end user will need to purchase sodium salt blocks, solar salt and/or pellets that are used to generate the salt water or brine solution used during the above-outlined regeneration cycle. Similar expenses and cycles occur in other ion exchange and filter systems.

Another cost associated with the above-outlined regeneration cycle relates to the volume of water used by the example cation exchange water softener during the regeneration cycle. Whether the water used by the example cation exchange water softener comes from a well, a utility main line, or any other source, there may be inherent expenses associated with supplying and/or disposing of that water. In the case of a well, there may be costs related to operating a water pump to draw the water from the well. These costs can include, for example, electricity used to operate the pump, maintenance/replacement costs during the life span of the pump and expenses associated with drilling the well to further depths to reach a sustainable water table. In the case of water from a utility main line, there may be utility costs based on the volume of water supplied through the utility main line. Furthermore, regardless of the source of the water, there may be costs associated with disposing of that water, such as, for example, sewer costs, septic tank costs and the like. Additionally, these water expenses may be conditional on local, environmental issues, such as droughts, water caps and water usage restrictions (e.g., by volume or time of day).

Accordingly, systems, apparatus and methods are provided for reclaiming water that has been discharged during a cycle of a water processing system.

SUMMARY OF DISCLOSED EMBODIMENTS

A water discharge management system for a water processing system is disclosed. The water processing system is connected to a first solution supply and to a second solution supply. A first multi-way valve is connected to a discharge outlet of the water processing system. A second multi-way valve is connected to the first multi-way valve and to a first water storage container. A third multi-way valve is connected to the second multi-way valve and to a second water storage container. The third multi-way valve is also connected to the first water supply.

A water discharge management system for a water processing system is also provided including a water processing system connected to a first solution supply and to a second solution supply. A multi-way valve is connected to a discharge outlet of the water processing system arranged to convey discharge water to at least one of a coupled storage container and the water processing system.

A water discharge management system is further provided having a plurality of interconnected multi-way valves. At least one of the plurality of interconnected multi-way valves is coupled to a discharge port of a water processing system. The multi-way valves are controllable to selectively separate discharge water during a water processing cycle into waste, grey water, potable water, and regenerant solution such that discharge water is reclaimed by the system.

A method of water discharge management in a water processing system is also provided. The method includes providing a supply of a first solution, providing a supply of a second solution, and selectively supplying the first solution to a water processing system and the second solution to the water processing system. The method further includes controllably and selectively directing discharge water formed in the water processing system through a first multi-way valve to a waste outlet during a period in which the discharge water satisfies a first selected criteria, and to a second multi-way valve during a period in which the discharge water satisfies a second selected criteria. The method also includes controllably and selectively directing the discharge water through the second multi-way valve to a first storage container connected to the second multi-way valve during a period in which the discharge water satisfies a third selected criteria, and to a third multi-way valve during a period in which the discharge water satisfies a fourth selected criteria. In addition, the method includes controllably and selectively directing the discharge water through the third multi-way valve to a second storage container during a period in which the discharge water satisfies a fifth selected criteria, and the discharge water as a solution to the supply of first solution during a period in which the discharge water satisfies a sixth selected criteria.

A further water discharge management system is provided. The water discharge management system includes a water processing system, a controller provided with an executable recapture protocol, and a plurality of controllable multi-way valves which control and implement a regeneration cycle of the water processing system based upon the recapture protocol. Each controllable multi-way valve is in operable communication with the controller through a signal path. The controllable multi-way valves are responsive to a signal exchanged with the controller through the signal path and operable between a first position connecting an input from the water processing system to a first output, and a second position connecting the input from the water processing system to a second output.

In various examples of embodiments, a controller of a water discharge management system selectively and/or controllably connects a discharge line or tube of a cation exchange water softener, during a regeneration cycle, to a waste water drain line or to the water discharge management system. The water discharge management system reclaims the discharged water to be used for one or more future purposes. In various examples of embodiments, the water discharge management system returns at least a portion of the discharged water to a brine tank or other regenerant solution storage tank used by the cation exchange water softener of the water discharge management system. In various other examples of embodiments, the water discharge management system directs one or more other portions of the discharged water to a storage tank for later use, such as, for example, use as grey water or as potable water.

In various examples of embodiments, a water discharge management system that includes a water softener, such as, for example, a cation exchange water softener, reclaims water discharged during a regeneration cycle of the water softener if that water has secondary uses, such as, for example, use as brine or another regenerant solution, grey water and/or potable water. In various ones of these examples of embodiments, a controller for the water softener also controls one or more motorized valves of the water discharge management system. The motorized valves are usable to direct the discharged water to a drain or waste line if the discharged water has no secondary uses and to one or more storage containers of the water discharge management system if that discharged water has a secondary use. In various ones of these examples of embodiments, the controller of the water discharge management system controls at least one motorized three-way valve to selectively discard or reclaim the water discharged from the water softener.

In various examples of embodiments, a water discharge management system controllably operates a water softener, one or more controllable motorized valves and one or more storage tanks to reclaim discharged water released during a regeneration cycle of the water softener if that water has a secondary use, such as, for example, as a source of brine, as a source of grey water, etc.

These and other features and advantages of various examples of embodiments of systems and methods are described in, or are apparent from, the following detailed descriptions of various examples of embodiments of various devices, structures and/or methods of the water discharge management system.

BRIEF DESCRIPTION OF DRAWINGS

Various examples of embodiments of the systems and methods disclosed herein will be described in detail, with reference to the following figures, wherein:

FIG. 1 is a schematic view of a cation exchange water softener in a first state of use, such as but not limited to after regeneration;

FIG. 2 is a schematic view of the cation exchange water softener of FIG. 1 in a second state of use, where hard water ions in the water are replaced with soft water ions;

FIG. 3 is a schematic view of the cation exchange water softener of FIG. 1 in a third state of use, where regeneration is desirable;

FIG. 4 is a schematic view of the cation exchange water softener of FIG. 1 in a fourth state of use, during a backwash stage of the regeneration cycle;

FIG. 5 is a schematic view of the cation exchange water softener of FIG. 1 in a fifth state of use, as a regenerant solution stage begins;

FIG. 6 is a schematic view of the cation exchange water softener of FIG. 1 in a sixth state of use, as the regenerant solution stage nears completion;

DETAILED DESCRIPTION

Figure 7:
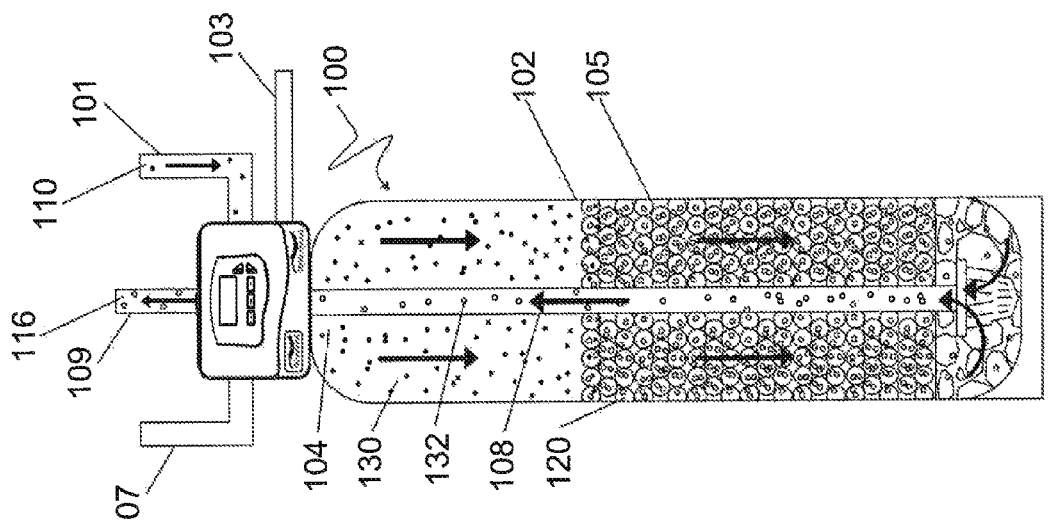
FIG. 7 is a schematic view of the cation exchange water softener of FIG. 1 in a seventh state of use, during an initial portion of the slow rinse stage where the regenerant solution is recapturable and/or reclaimable.

The discussion herein describes various examples of a water softener system. The use of a water softener system is for purposes of example only. While a water softener system and a cation exchange used therewith are specifically described herein to illustrate the examples, one of skill in the art would understand that the discussion herein may be applied to any suitable ion exchange system where some or all of the regeneration water may be desirable to be reclaimed, such as, but not limited to, a dealkalizer, as well as to a filtration system, such as but not limited to a carbon filter or particulate filter. For example the water processing system herein may be or include a water conditioning unit, an ion exchange system including cation and anion exchange systems (cation exchange systems may include but are not limited to water softening systems, and radium removal systems; anion exchange systems include but are not limited to dealkalizers, tannin removal systems, nitrate removal systems, arsenic removal systems), a water filtration system including but not limited to pH filters, acid neutralizers, carbon filtration systems, taste and odor filters, multi-media filters, filter ag filters, birm filters, iron filters, hydrogen sulfide filters, sand filters, and particulate filters.

As outlined above, cation exchange water softeners and other ion exchange systems require periodic regeneration for example to remove hard water ions from the water softener and replace those hard water ions with soft water ions. Over the course of a regeneration cycle, soft water ions in a regenerant solution, such as, for example, a brine solution, initially replace many of the hard water ions that were previously associated with the resin beads, leaving soft water ions associated with the resin beads and the hard water ions dispersed in the discharge water. Those hard water ions are removed from the cation exchange water softener as the discharge water is discharged. As such, there is an initial time period, during a backwash stage and/or at the beginning of a regenerant solution stage of the regeneration cycle, during which the discharge water being discharged from the cation exchange water softener contains a very high concentration of hard water ions (referred to in the following description as highly alkaline water) and/or a low concentration of soft water ions, and may contain various particulates and/or precipitates, Conventionally, this very hard, highly alkaline discharge water is treated, in most instances, as waste water and is not reclaimed or captured for use as grey water.

As the regenerant solution stage of the regeneration cycle continues, the resin beads will continue to capture most of the soft water ions from the regenerant solution and release more of the hard water ions into the regenerant solution, turning the regenerant solution into the discharge water. However, as the regeneration cycle proceeds, this exchange continues at a decreasing rate. That is, fewer exchanges will happen in a given period of time as the regenerant stage of the regeneration cycle continues, such that increasing amounts of the soft water ions remain in the regenerant solution/discharge water as it exits the bed of resin beads, while decreasing amounts of the hard water ions are released into the regenerant solution/ discharge water. Eventually, the resin beads will have captured as many soft water ions as they can hold and will have released all or most of the hard water ions into the discharge water. That is, from this point on in the regeneration cycle, relatively few hard salt ions will be stripped from the resin beads, allowing relatively few soft water ions to associate with the resin beads, resulting in a high concentration of soft water ions, and a low or zero concentration of hard water ions, in the discharge water.

Finally, during one or more rinsing stages, the remaining regenerant solution left in the water softener is rinsed from the cation exchange water softener with water from a raw water supply, such as, for example from a well or a utility main line. The one or more rinsing stages result in a steep decline in the concentration of soft water ions in the discharge water, as soft water ions are no longer being introduced into the cation exchange water softener and decreasing amounts of soft water ions remain to be rinsed out.

There are thus one or more time periods during which the water being discharged from the cation exchange water softener will have a sufficiently high concentration of soft water ions. This high-soft-water-ion-concentration discharge water (which may be referred to as sweet brine) can be reclaimed and used as a source of regenerant solution for future regeneration cycles, or even reused during the same regeneration cycle, res in a savings of resources (e.g., salt and water), and thus money, to the user.

Likewise, there is at least one time period during regeneration when the discharge water being discharged from the water softener will have a sufficiently low concentration of soft water ions. The discharge water during these time periods can be reclaimed and used as a grey water source. That is, this discharge water can be used as grey water to water plants, operate toilets and/or can be used in other non-potable situations.

It should be appreciated that there may be other portions of the discharge water that may be desirably reclaimed or recaptured for secondary use. For example, there may be periods during the regeneration cycle when the discharge water being discharged from the water softener can be collected and used as a potable water source. In general, it may be desirable to reclaim the discharge water being discharged from the water softener whenever that discharge water has any desired secondary use. It should also he appreciated that the reclaimed or recaptured discharge water may be treated or otherwise altered before becoming useful for a secondary purpose. In various examples of embodiments, it may be desirable to recapture and/or reclaim all of the discharge water discharged during the regeneration cycle and to subsequently treat and/or use that discharge water for a variety of different purposes. Moreover, different portions of the discharge water can be reclaimed and/or recaptured, and stored into different storage tanks or containers, such as the regenerant solution tank and/ or one or more separate storage tanks. While specific tanks or containers are provided herein for examples, one or multiple storage tanks or containers both upstream and downstream of the water processing system may he used. One or more of the separately stored reclaimed and/or recaptured portions of the discharge water can then be subjected to different treatments. It is also noted that in certain systems regeneration and/or regenerant solution may not be required, such as for example in a water filtration system, such as but not limited to a carbon filter or a particulate filter.

In the following description of various examples of embodiments, the regenerant solution enters the top of the tank or container, flows down through the resin beads, and then out the internal discharge tube. This flow pattern is commonly called "downflow" brining. It is also acceptable to reverse the flow direction, i.e., performing "upflow" brining. This simply requires introducing the regenerant solution into the tank so that it flows down through the internal discharge tube, up through the resin beads and out through the top of the tank. It should be appreciated that systems, methods and devices described herein, including the following examples of embodiments operate equally regardless of whether upflow or downflow brining is used.

FIGS. 1-9 show schematic views of a water processing system 100 in various states of use, including various stages or phases of a regeneration cycle. The water processing system may be suitable to treat water or solution and or a certain criteria or characteristic thereof. To this end, the water processing system may be or include a water conditioning unit, an ion exchange system including cation and anion exchange systems (cation exchange systems may include but are not limited to water softening systems, and radium removal systems; anion exchange systems include but are not limited to dealkalizers, tannin removal systems, nitrate removal systems, arsenic removal systems, a water filtration system including but not limited to pH filters, acid neutralizers, carbon filtration systems, taste and odor filters, multi-media filters, filter ag filters, birm filters, iron filters, hydrogen sulfide filters, sand filters and particulate filters. While specific examples are provided, one of skill in the art would understand that any water processing or treatment system suitable for the purposes provided may be substituted in place of the examples herein. The example water processing system provided herein, shown in FIGS. 1-9, is a cation exchange water softener 100. The water softener 100 includes a tank 102, a first flow passage that admits fluids into atop region 104 of the tank, an internal discharge tube 108 extending from a bottom region 106 through the top region 104 of the tank 102 and that defines a second flow passage by extending through the first flow passage, and a bed of resin beads 120 located in a middle region 105 of the tank 102. In FIGS. 1-9, the hard water ions 130 are shown as solid black circles, while the soft water ions 132 are shown as hollow circles or rings.

FIGS. 1-9 also show one or more examples of embodiments of a water conditioning controller that controllably connects various inlet and outlet tubes or pipes or distribution channels or passages to the first and second flow passages described above. As shown in FIGS. 1-9, this example water conditioning controller has a raw water inlet port 101 that is connected to a raw water supply, a regenerant solution inlet tube 103 that is connected to a regenerant solution storage tank, a soft water outlet port 107 that is connected to the building's soft water supply pipes, and an external discharge tube 109 that is connected to a waste line. It should be appreciated that FIGS. 1-9 show instantaneous moments of use.

As shown in various ones of FIGS. 1-9, at different times, the cation exchange water softener 100 can be supplied with a solution, such as but not limited to hard raw water 110 from the raw water supply via the raw water inlet port 101 or a solution, such as but not limited to a regenerant solution 112 from the regenerant solution storage tank via the regenerant solution inlet tube 103, can supply or output softened water 111 or 113 to the soft water supply pipes via the soft water outlet port 107, and can discharge brackish water, highly alkaline water, other generally unreclaimable water and the like, including as waste water 115, reclaimable portions 114 of the regenerant solution 112 and/or reclaimable water 116 via the external discharge tube 109. In practice, the raw water 110 and/or the regenerant solution 112 supplied into the cation exchange water softener 100 typically moves continuously through the bed of resin beads 120. The hard water ions 130 and the soft water ions 132 are present in various concentrations, and are present either as ions associated with the resin beads 120, or as dissolved or free ions in the raw water 110, the regenerant solution 112, the softened water 111 and 113, the waste water 115, the reclaimable regenerant solution portions 114 and/or the reclaimable water 116.

As shown in FIGS. 1-9, the raw water 110 contains a lame concentration of dissolved hard water ions 130. This may be representative of an initial source of water (e.g., from a well or a utility main line) in an area with particularly hard water. It should be appreciated that the hard water ions 130 may also include other contaminants, including but not limited to ionic contaminants or dissolved particles that are desirably removed from the raw water 110. The terms "hard water ions" and "soft water ions" are used for clarity reasons, but it should he appreciated that the contaminants or ions in the water may not be typically referred to as hard or soft. In various examples of embodiments, the hard water ions 130 include one or more of iron, manganese, calcium and/or magnesium ions, and can include any other ions (i.e., ionic elements, chemicals, compounds or the like) that can be captured by, attached to or associated with those resin beads 120 having available soft water ions. Likewise, the soft water ions 132 may be any ion that can be used to desirably replace the hard water ions 130 that are present in the raw water 110. In various examples of embodiments, the majority of soft water ions 132 are sodium ions, but they may also be potassium ions or any other known or later developed ionic chemicals, compounds or the like useable to replace the hard water ions 132 in the raw water 110 using the cation exchange water softener 100 or other ion exchange system.

FIGS. 1-3 show the cation exchange water softener 100 during a water softening phase or cycle. During this water softening phase or cycle, the water conditioning controller is in a first state, where it connects the first flow passage to the raw water port 101 and the second flow passage to the soft water outlet port 107. As a result, the hard raw water 110 flows into the top portion 104 through the raw water inlet port 101, while softened water 111 flows out of the internal discharge tube 108, through the water conditioning controller and into the soft water outlet port 107.

As shown in FIG. 1, in an initial portion of the water softening phase or cycle, such as, for example, immediately after a regeneration cycle has been completed, the raw water 110 includes a high concentration of hard water ions 130, while the resin beads 120 include a high concentration of soft water ions 132. The condition shown in FIG. 1 is consistent with a source of hard raw water 110 being supplied to the cation exchange water softener 100 to be softened, and the cation exchange water softener 100 being in a condition suitable to soften the raw water 110.

Thus, as shown in FIG. 1, the raw water 110 entering the cation exchange water softener 100 through the first flow passage into the top region 104 above the bed of resin beads 120 contains primarily hard water ions (black circles) 130. The hard raw water 110 flows downwardly into and through the bed of resin beads 120, which, in this state, hold primarily soft water ions (rings) 132. In contrast to the input hard raw water 110, the softened water 111 flowing out of the bottom of the bed of resin beads 120 into the bottom region 106 and traveling upwardly through the internal discharge tube 108 contains primarily soft water ions (rings) 132.

As shown in FIG. 2, during an example water softening phase or cycle, the soft water ions 132 replace the hard water ions 130 in the raw water 110, leaving the hard water ions 130 attached to the resin beads 120. As the water softening phase or cycle continues, the hard water ions 130 collect on the resin beads 120, while the soft water ions 132 are removed from the resin beads 120 as the raw water 110 is converted into the softened water 111 discharged from the cation exchange water softener 100. Moreover, during a water softening phase or cycle, the resin beads 120 in the cation exchange water softener 100 are gradually depleted of their soft water ions 132 as they become saturated with the hard water ions 130. Accordingly, as shown in FIG. 2, the resin beads 120 in this water softening phase hold increasing amounts of the hard water ions 130, as well as significant but decreasing amounts of the soft water ions 132.

As shown in FIG. 3, the resin beads 120 ultimately become saturated with the hard water ions 130, having lost most or all of the soft water ions 132 previously associated with or attached to the resin beads 120. At some point, the resin beads 120 will no longer be able to replace a sufficient number of hard water ions 130 present in the raw water 110 with soft water ions 132 to sufficiently soften the raw water 110, resulting in imperfectly softened water 113. Eventually, rather than supplying the softened water 111, or even the imperfectly softened water 113, the raw water 110 merely passes through the resin beads and is output from the cation exchange water softener 100. Of course, it should be appreciated that the regeneration cycle can be initiated before this occurs, or even before the cation exchange water softener 100 begins outputting the imperfectly softened water 113.

In order to continue using the cation exchange water softener 100 to soften the raw water 110, the resin beads 120 need to be regenerated to remove the hard water ions 130 and resupply the resin beads 120 with soft water ions 132. That is, as shown in FIG. 3, while the imperfectly softened water 113 flowing out of the bed of resin beads 120 contains primarily soft water ions (rings) 132, increasing amounts of the hard water ions (black circles) 130 remain in the water 113 flowing out of the bed of resin beads 120 and upwardly through the discharge tube. In contrast to FIG. 1, the resin beads 120 in this state primarily hold hard water ions 130, although insignificant and decreasing amounts of the soft water ions 132 may remain associated with the resin beads 120.

FIG. 4 shows an initial phase of a regeneration cycle of the cation exchange water softener 100. This initial phase or stage of the regeneration cycle is typically a backwash phase or stage. During this backwash phase or stage, the water conditioning controller moves from the first state, to a second state it connects the second flow passage to the raw water port 101 and the first flow passage to the external discharge tube 109. The external discharge tube 109 is connected either to a waste water drain or to a brine reclaim tank.

It should be appreciated that the downstream soft water distribution system is not completely cut off from the raw water supply during the regeneration cycle. Rather, in this second position, as well as in the third, fourth and fifth positions discussed below with respect to FIGS. 5-9, the water conditioning controller uses a bypass passage to connect the raw water port 101 directly to the downstream soft water outlet port 107. In FIGS. 4-9, the bypass hard water flowing through the soft water outlet port 107 is omitted.

As shown in FIG. 4, in this initial backwash phase, the direction of flow is reversed from that shown in FIGS. 1-3 and 5-9, with the raw hard water 110 flowing downwardly out of the bottom of the internal discharge tube 108 and then upwardly through the bottom portion 106 of the tank 102 and through the resin beads 120. This reverse flow lifts the resin beads 120 upwardly towards the top of the tank 104, allowing the reversely flowing hard raw water 110 to flush the tank 102 of turbidity and debris that may have been filtered out by the resin beads 120 from the raw water 110 during the water softening cycle shown in FIGS. 1, 2 and 3.

That is, the discharge water flowing out the first flow passage, through the water conditioning controller and into the external discharge tube 109 is waste water 115 that is carrying the turbidity and debris flushed from the tank 102. This portion of the waste water 115 is occasionally unsuitable for any secondary uses. However, in many cases, after an initial portion of this backwash phase or stage, rather than the waste water 115, the discharged water is relatively clear raw hard water 110 that is suitable for recapture as reclaimable water 116. This reclaimable water 116 is output from the external discharge tube 109 for the remainder of this phase of the regeneration cycle as well as a beginning portion of the next, regenerant, phase of the regeneration cycle.

FIG. 5 shows initial portions of the regenerant solution phase of the regeneration cycle of the cation exchange water softener 100, while FIG. 6 shows a final portion of the regenerant solution phase. During this regenerant solution phase or stage, the water conditioning controller moves from its second position (or first position if the backwash phase is omitted), to a third position, where the first flow passage is connected to the regenerant solution inlet tube 103, which is connected to a regenerant solution tank (not shown) containing a regenerant solution, while the second flow passage is again connected to the internal discharge tube 108 and to the external discharge tube 109. As shown in FIGS. 5 and 6, during this regenerant solution phase, the regenerant solution 112, which has a high concentration of soft water ions 132, is supplied to the cation exchange water softener 100. The regenerant solution 112 is a saturated or nearly saturated solution of soft water ions 132 (e.g., sodium ions) in water. In various examples of embodiments, the regenerant solution 112 is a brine solution. The regenerant solution 112 thus supplies a high concentration of soft water ions 132 to the cation exchange water softener 100 and the resin beads 120. The soft water ions 132 present in the regenerant solution 112 will then replace the hard water ions 130 currently associated with the resin beads 120.

Initially, as shown in FIG. 5, during a first portion of the regenerant solution phase of the regeneration cycle, an abundance of hard water ions 130 are associated with the resin beads 120 and an abundance of soft water ions 132 are dissolved in the regenerant solution 112. As such, the soft water ions 132 easily dislodge or disassociate the hard water ions 130 from the resin beads 120 and become captured by, attached to or associated with the resin beads 120. As shown in FIG. 5, this waste water 115 discharged from the cation exchange water softener 100 initially contains a high concentration of hard water ions 130 (jettisoned or dislodged from the resin beads 120 by the soft water ions 132) and a relatively low concentration of the soft water ions 132.

That is, as shown in FIGS. 5 and 6, in the regenerant solution phase or stage of the regeneration cycle, in place of the hard raw water 110, the regenerant solution 112 is introduced into the cation exchange water softener 100 in the top region 104 above the bed of resin beads 120. The resin beads 120 initially extract a substantial proportion of the soft water ions 132 from the water solution 112, driving an initially high concentration of hard water ions 130 into the regenerant solution 112, turning it into the waste water 115. Consequently, in contrast to the softened water 111 shown in FIG. 1, in FIG. 5, waste water 115 flows out of the bottom of the bed of resin beads 120, into the bottom portion 106 of the tank 102 and upwardly through the internal discharge tube 108.

As shown in FIG. 5, during the initial portions of the regenerant solution phase, the resin beads 120 continue to hold primarily hard water ions 130, while increasing amounts of the soft water ions 132 become associated with the resin beads 120. In intermediate portions of the regenerant solution phase (not shown), the resin beads 120 hold significant but decreasing amounts of the hard water ions 130, while holding significant and increasing amounts of the soft water ions 132. Additionally, in intermediate portions of the regenerant solution phase, small but increasing amounts of the soft water ions 132 pass through the bed of resin beads 120 and thus are present in the discharge water.

As shown in FIG. 6, in later or final portions of the regenerant solution phase, the resin beads 120 become saturated with soft water ions 132, while the regenerant solution 112 continues to have a high concentration of the soft water ions 132. That is, the supplied regenerant solution 112, which has a high concentration of soft water ions 132, will retain the majority of its soft water ions 132, rather than exchanging them for hard water ions 130 attached to the resin beads 120. At this stage in the regeneration cycle, the regenerant solution 112 effectively passes through the bed of resin beads 120 into the bottom portion 106 of the tank 102. Accordingly, in these intermediate to later portions of the regenerant phase, the cation exchange water softener 100, rather than discharging the waste water 115 through the external discharge tube 109, now discharges reclaimable regenerant solution 114. That is, the fluid discharged from the cation exchange water softener 100 in these intermediate to later portions of the regenerant phase has a high concentration of soft water ions 132, and thus may be appropriately be reclaimed, stored into the regenerant solution tank and reused in subsequent regeneration cycles.

Figure 8:
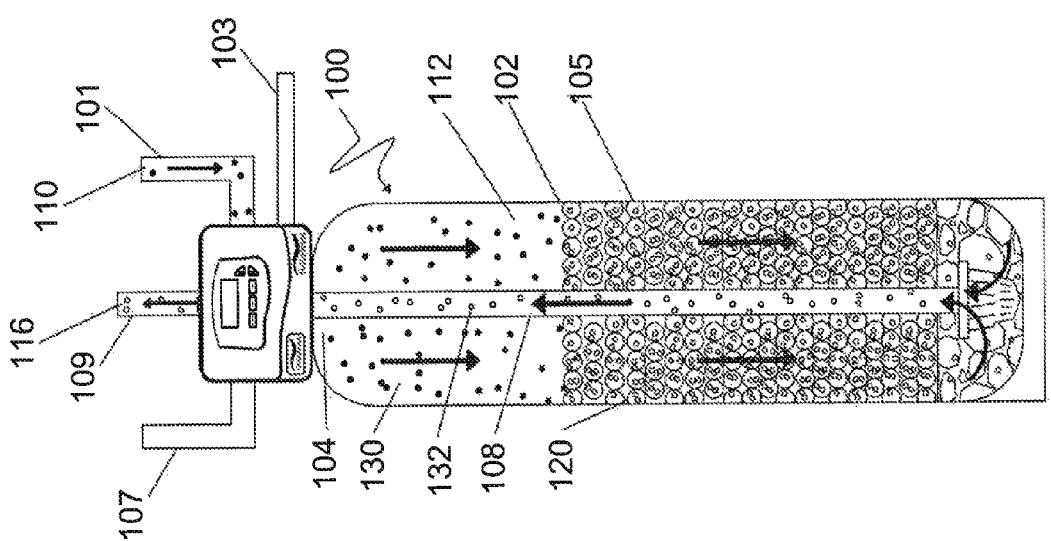
FIG. 8 is a schematic view of the cation exchange water softener of FIG. 1 in an eighth state of use, during an intermediate and/or latter portion of the slow rinse stage of the regeneration cycle, where reclaiming the discharge water as the regenerant solution is no longer desirable, but where the discharge water is not yet desirably recaptured for use as grey water.

FIGS. 7 and 8 show initial portions of a slow rinse phase of the regeneration cycle of the cation exchange water softener 100. During these initial portions of this slow rinse phase, the flow of regenerant solution through the regenerant solution inlet tube 103 is stopped or cut off, while the second flow passage remains connected to the external discharge tube 109. This can be accomplished, for example, by using an aircheck in the regenerant solution tank (not shown), which checks the flow of regenerant solution into the regenerant solution inlet tube 103. As shown in FIG. 8, in the initial portions of this slow rinse phase, the discharged water contains lower and decreasing concentrations of soft water ions 132. As a result, the discharged water is no longer reclaimable regenerant solution 114. Moreover, the discharged water has a very low concentration of hard water ions 130. Thus, the discharged water is now reclaimable water 116 that is suitable for recapture and storage as a grey water source. The reclaimed reclaimable water 116 may be used in situations that do not require potable water, such as, for example, operating toilets, watering plants and the like.

Figure 9:
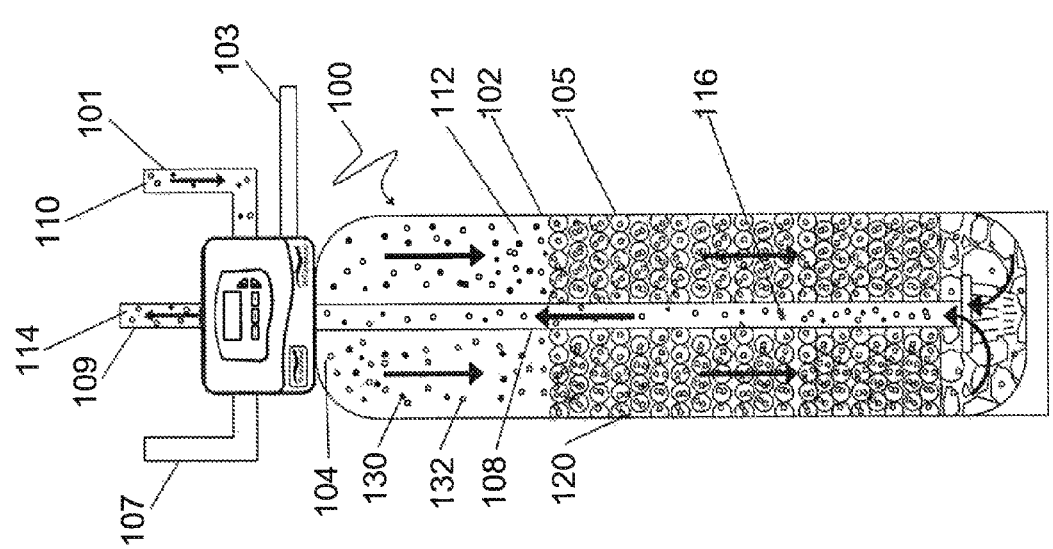
FIG. 9 is a schematic view of the cation exchange water softener of FIG. 1 in a ninth state of use, during a final portion of the slow rinse stage and/or during a fast rinse stage of the regeneration cycle where the discharge water may be recaptured for use as grey water.

FIG. 9 shows a fast rinse phase of the regeneration cycle of the cation exchange water softener 100. During this fast rinse phase, the water conditioning controller moves from its second position to a third position, where the first flow passage is connected to the raw water inlet port 101, while the second flow passage remains connected to the external discharge tube 109. As shown in FIG. 9, the flow rate of the hard raw water from the raw water inlet port 101 through the inlet tube and into the tank 102 increases substantially, repacking the resin beads 120 that were loosened during the backwash phase. The discharged water exiting the tank 102 through the second flow passage and the water conditioning controller and into the external discharge tube 109 is now reclaimable water 116 that may be suitable for recapture and storage as a grey water source.

Thus, reclaiming the discharged water during specific time intervals of the regeneration cycle may result in reclaiming reclaimable regenerant solution 114 that retains a high concentration of soft water ions 132. This reclaimed regenerant solution 114 may be useable as a source of soft water ions 132 for the current and/or future regeneration cycle. Likewise, reclaiming the discharged water during other specific time intervals of the regeneration cycle may result in recapturing the reclaimable water 116 at a time when it has a sufficiently low concentration of soft water ions 132. This portion of reclaimed water 116 may be useable as a grey water source for water needs that do not require potable or softened water (e.g., operating toilets, watering plants, etc.) Additionally, sensors may be used to determine the actual or expected concentrations of hard water ions 130 and/or soft water ions 132 present in the discharged water, as a factor in determining whether it is desirable to reclaim various portions of the discharged water for one or more secondary uses.

It should be appreciated that, in various other examples of embodiments, the waste water 115 may be recaptured, rather than being discharged into a drain or sewer line as waste water. In some such examples of embodiments, the recaptured waste water 115 may be treated and/or may be combined with either and/or both of some or all of the reclaimable water 116 and/or some or all of the reclaimed regenerant solution 114 to form an additional amount of grey water. Finally, if portions of the reclaimable water 116 meets certain standards and/or can be treated to meet those standards, those portions of the reclaimable water 116 can be stored as a source of potable water.

Figure 10:
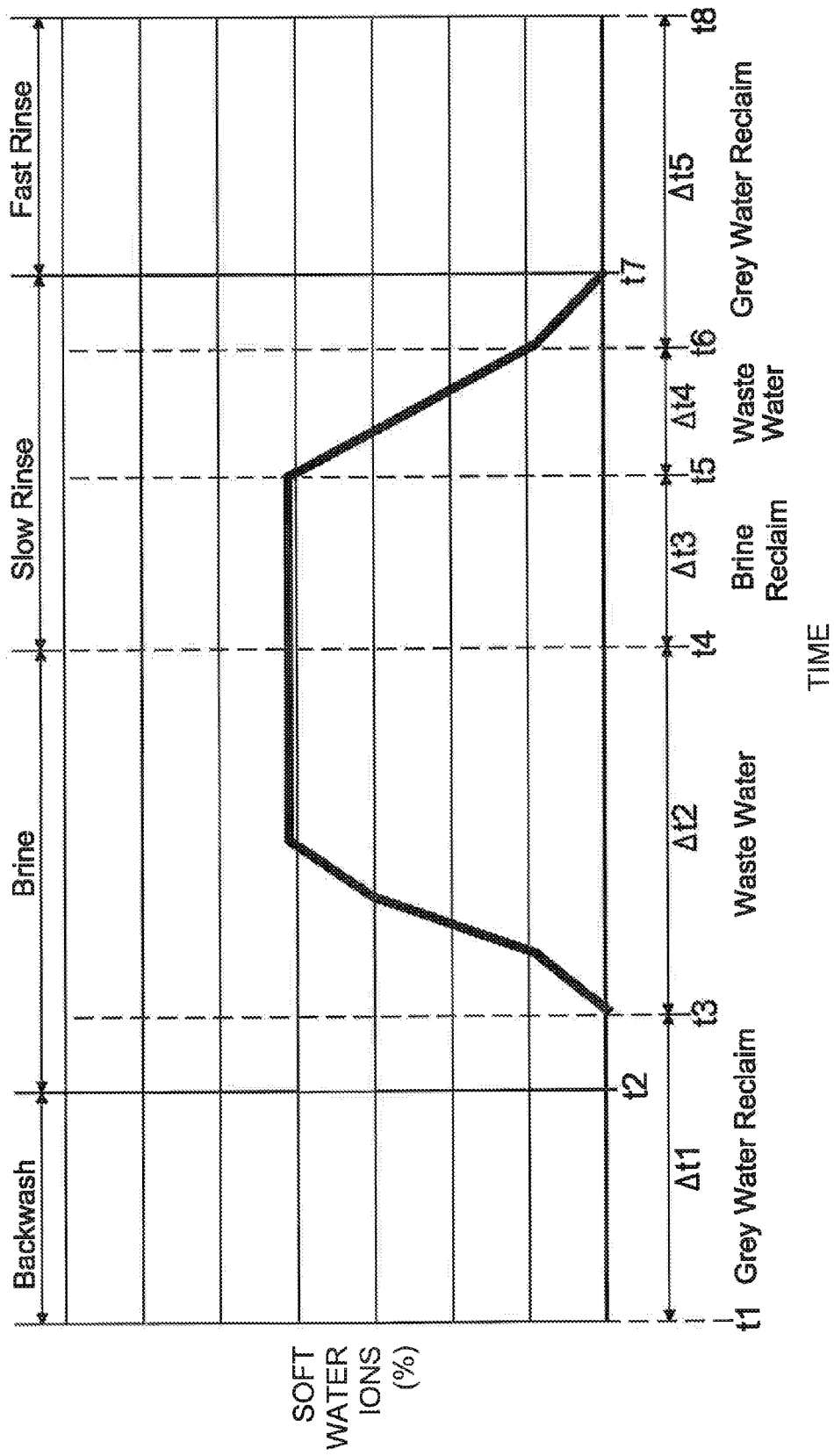
FIG. 10 is a graph outlining the relative soft water ion concentration of water exiting a cation exchange water softener over time during various stages of the regeneration cycle, along with indications of various time periods where reclaiming the discharge water as reclaimed regenerate solution and/or recaptured grey water is appropriate.

FIG. 10 shows a graph representing the relative concentration of soft water ions 132 (and thus the corresponding concentration of hard water ions 130) present in the discharged water output through the external discharge tube 109 at various times during a regeneration cycle. As shown in FIG. 10, during latter portions of the backwash phase and initial portions of the regenerant solution phase, the discharged water has a low concentration of soft water ions 132 and a high concentration of hard water ions 130 due to the raw water 110 used during the backwash phase and due to a substantial portion of the soft water ions 132 in the regenerant solution 112 replacing or changing places with the hard water ions 130 initially associated with the resin beads 120.

As the regenerant solution phase continues, the concentration of soft water ions 132 in the discharged water increases and the concentration of hard water ions 130 decreases as there are fewer hard water ions 130 associated with the resin beads 120 for the soft water ions 132 to trade places with, and thus fewer soft water ions 132 replacing hard water ions 130 associated with the resin beads 120. At some point during the regenerant solution phase, the concentration of soft water ions 132 in the discharged water levels off, and remains generally at that level during the final portions of the regenerant solution phase and/or during initial portions of the slow rinse phase. Then, during latter portions of the slow rinse phase and/or during the fast rinse phase, the concentration of soft water ions 132 in the discharged water decreases substantially.

Figure 11:
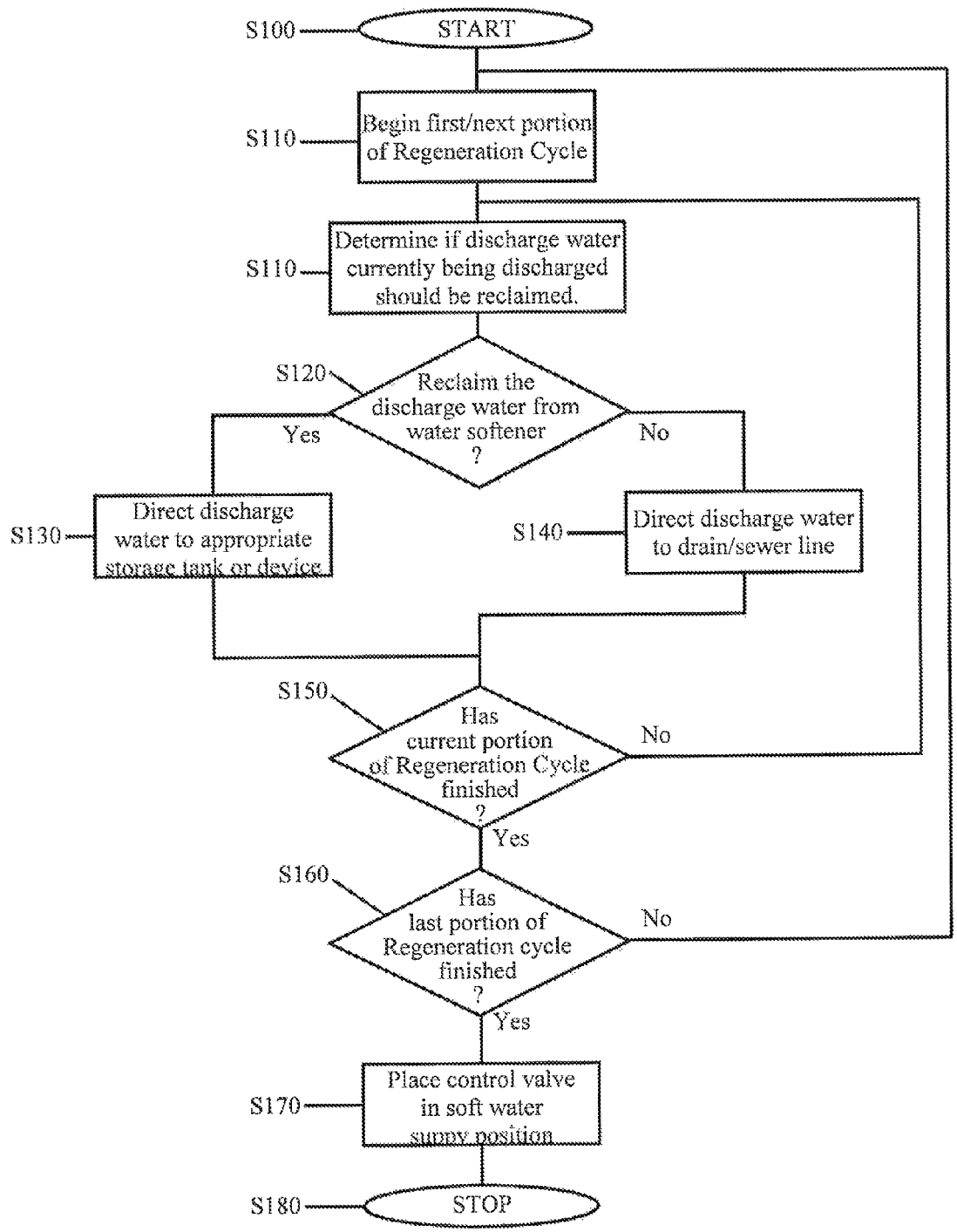
FIG. 11 is a flowchart outlining one or more examples of embodiments of a method for reclaiming various types of water and/or regenerant solution during the regeneration cycle of a cation exchange water softener according to this invention.

As outlined above, it may be desirable to reclaim or recapture the discharged water from the cation exchange water softener 100 during one or more specific time periods of the regeneration cycle when the discharged water may be usable for one or more secondary uses. FIG. 11 illustrates one or more examples of embodiments of a recapture/reclaim protocol useable to control one or more controllable valves of a water discharge management system according to this invention that is connected to between the external discharge tube 109 and the drain or sewer line. At least one of the one or more controllable valves is provided between the external discharge tube 109 and the drain or sewer line to divert reclaimable or recapturable discharge water from the drain or sewer line. These controllable valves allow the discharged water supplied from the water conditioning controller to the external discharge tube 109 to be redirected to one or more grey water storage tank(s), one or more regenerant solution tank(s), one or more treatment storage tank(s) or one or more potable water storage tank(s) or the like.

Figure 12:
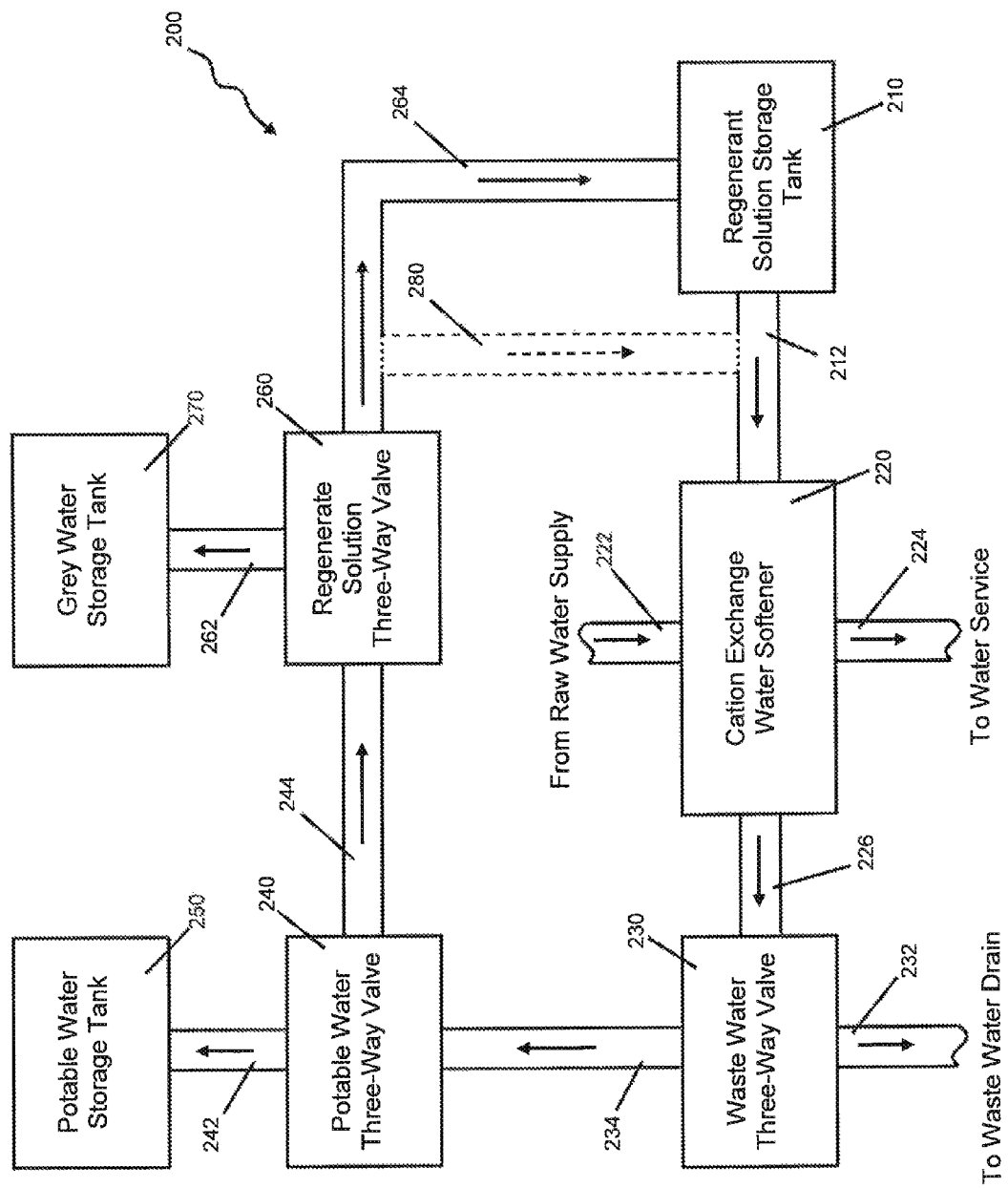
FIG. 12 is a schematic representation of one or more examples of embodiments of a water discharge management system that is usable to reclaim or recapture various types of water and/or regenerant solution during the regeneration cycle of a cation exchange water softener.

As shown in FIGS. 10-12, in this example of one or more embodiments of the regeneration cycle, the backwash phase of the cation exchange water softener 100 began at some time t1. As discussed above, during an initial portion of the backwash phase, between times t1 and t2, the discharge water may be unsuitable for recapturing or reclaiming. However, by time t2, the discharge water has cleared sufficiently that it can be recaptured for a particular use, such as for use as grey water. Accordingly, as shown in FIG. 10, beginning at time t2, for a first grey water recapture period Δt1, the water discharge management system connected to the external discharge tube 109 controls one or more of the controllable valves to direct the recaptured water from the discharge tube to a grey water storage tank. The backwash phase of the cation exchange water softener 100 continues to time t3, at which point the backwash phase ends and the regenerant solution phase or brine phase of the cation exchange water softener 100 begins.

However, in the example embodiment shown in FIG. 10, recapturing the discharge water as grey water continues beyond time t2 for the entire first grey water recapture period Δt1, although it can stop prior to that point in time. That is, in the example embodiment shown in FIG. 10, the first grey water recapture period Δt1 extends beyond time t2 and continues until a time t3 and thus covers an initial portion of the regenerant solution phase. That is, as discussed above, during an initial portion of the regenerant solution phase, the discharge water remains recapturable as grey water. However, in the example embodiment shown in FIG. 10, at time t3, the soft water ion concentration in the discharge water has risen sufficiently that the discharge water is no longer suitable for use as grey water. It should be appreciated that time t3 does not represent a fixed point along the time line shown in FIG. 10, but may vary depending on the percentage of soft water ions in the discharged water, the maximum amount of soft water ions permitted in the reclaimable water, and any other known or later developed factor or criteria or characteristic.

Thus, as shown in FIG. 10, beginning at time t3, for a first waste water period Δt2, the water discharge management system connected to the external discharge tube 109 controls one or more of the controllable valves to direct the discharge water, which is now waste water, from the external discharge tube 109 to the drain or sewer line. The regenerant solution phase or brine phase of the cation exchange water softener 100 continues to time t4, at which point the regenerant solution phase or brine phase ends and the slow rinse phase of the cation exchange water softener 100 begins.

At some time after time t3, the soft water ion concentration in the discharge water reaches a maximum value. Subsequently, at time t4, not only does the regenerant solution phase or brine phase end, but the first waste water period Δt2 also ends, and a first regenerant solution reclaim period Δt3 begins. Consequently, as shown in FIG. 10, beginning at time t4, for the first regenerant solution reclaim period Δt3, the water discharge management system connected to the external discharge tube 109 controls one or more of the controllable valves to direct the reclaimable regenerant solution from the discharge tube to a regenerant solution generating tank, to a regenerant solution storage tank and/or back to the cation exchange water softener 100. The regenerant solution generating tank contains a supply of a dissolvable chemical compound that will dissolve in the water supplied into that tank to generate the saturated regenerant solution to be used during the regenerant solution phase. Of course, it is understood that a pre-mixed or other unmixed solution may be used as a regenerant solution.

It should be appreciated that the first waste water period Δt2 can end, and thus the first regenerant solution reclaim period Δt3 can begin, at any suitable time after the soft water ion concentration in the discharge water reaches a maximum value. Thus, the first regenerant solution reclaim period Δt3 can begin during the regenerant solution or brine phase. However, once the first regenerant solution reclaim period Δt3 begins, it may be desirable to reclaim as much of the regenerant solution as possible, and thus it is uncommon to end the first regenerant solution reclaim period Δt3 before time t5.

As outlined above, in the example embodiment shown in FIG. 10, the first regenerant solution reclaim period Δt3 extends over an initial portion of the slow rinse phase, between times t4 and t5. At time t5 during the slow rinse phase, the soft water ion concentration in the discharge water begins to decline. Thus, at time t5, the first regenerant solution reclaim period Δt3 ends. However, the soft water ion concentration in the discharge water is still high, and thus the discharge water may not be suitable for reclaiming or recapturing. Accordingly, a second waste water period Δt4 begins at time t5 and extends until time t6, which is also during the slow rinse phase. During the second waste water period Δt4, the water discharge management system connected to the external discharge tube 109 again controls one or more of the controllable valves to direct the waste water from the external discharge tube 109 to the drain or sewer line.

Of course, it should be appreciated that, in other embodiments, the point of time along the time line where the discharge water becomes unsuitable for reclaiming or recapturing, i.e., point t5, can vary depending on the percentage of soft water ions in the discharged water, the maximum amount of soft water ions permitted in the reclaimable water, and any other known or later developed factor. Likewise, in other embodiments, the point of time along the time line where the discharge water again becomes suitable for reclaiming or recapturing, i.e., point t6, can vary based on the same or similar factors or criteria or characteristics.

It should be appreciated that the second waste water period Δt4 does not have to begin at time t5, but can begin at some other time after (or possibly before) time t5. Delaying the start of the second waste water period Δt4, and thus the end of the first regenerant solution reclaim period Δt3, would allow additional portions of the discharge water to be recaptured as reclaimed regenerant solution 114. Likewise, it should be appreciated that the second waste water period Δt4 does not have to end at time t6, but can end at some other time before (or possibly before) time t6. Moving up the end of the second waste water period Δt4, and thus the beginning of the next period Δt5, would allow additional portions of the discharge water to be recaptured as well.

At time t6, the second waste water period Δt4 ends and a second grey water recapture period Δt5 begins. As shown in FIG. 10, in this example embodiment, the second grey water period Δt5 encompasses a final portion of the slow rinse phase, between times t6 and t7, and between times t7 and t8, which is essentially all of a fast rinse phase. As in the first grey water recapture period Δt1, during the second grey water recapture period Δt5, the water discharge management system connected to the external discharge tube 109 controls one or more of the controllable valves to direct the recaptured water from the external discharge tube 109 to a grey water storage tank. It should be appreciated that this can be the same grey water storage tank or a separate grey water storage tank. At time t8, the regeneration cycle, and thus the flow of discharge water from the external discharge tube 109, ends.

As discussed above, the concentration of soft water ions 132 present in the discharged water solution 112 reaches a maximum after the second time period Δt2. After the third, fourth and fifth time periods Δt3, Δt4 and Δt5, the concentration of hard water ions 130 in the discharged water solution 112 begins to decrease, as water from the well or main line is used to rinse remaining brine from the cation exchange water softener 100.

It should be appreciated that the concentration of soft water ions 132 may need to reach a sufficient concentration before the soft water ions 132 can sufficiently replace the hard water ions 130 on the resin beads 120. As such, there may be a portion of time (such as for example, during second and/or third time periods Δt2 and/or Δt3, and/or during portions of one or both of these time periods) where the concentration of soft water ions 132 increases, while the amount of hard water ions 130 in the discharged water remains approximately steady.

It should be appreciated that the various fluids reclaimed or recaptured from the discharged water are not necessarily limited to being reclaimed and/or recaptured as in the embodiment outlined above with respect to FIG. 10. For example, it may be desirable to reclaim the discharged water as the reclaimed regenerant solution 114 during portions of the time periods Δt2, Δt3 and/or Δt4, which can then be used as a current or future source of the regenerant solution 112. Likewise, it may be desirable to reclaim the discharged water as reclaimable water 116 during other time periods when the discharged water being released has a desirable or usable concentration of soft water ions 132 and/or a desirable or usable concentration of hard water ions 130 for a particular use. For example, it may be desirable to reclaim the discharged reclaimable water 116 during at least some portions of the time periods Δt1, Δt2, Δt4 and/or Δt5 for later use as a grey water source, or even as a potable water source, in such cases, the discharged water is directed to a storage tank rather than into the drain/waste line.

It should be appreciated that various ones of the time periods Δt1, Δt2, Δt3, Δt4 and Δt5 may be actual time periods controlled by a timer or may be subjective time periods based on conditions or criteria or characteristics of the water discharge management system. For example, sensors may be provided that are usable to determine the actual or expected concentrations of hard water ions 130 and/or soft water ions 132 present in the discharged water. As such, the time period Δt2 may be a fixed, variable or determined time period between the beginning of the regeneration cycle or the regenerant solution phase and the point at which the concentration of soft water ions 132 reaches or is expected to reach a maximum. Likewise, the time period Δt3 may be a fixed, variable or determined delay to assure that the concentration of soft water ions 132 remains high and the time period Δt4 may be a fixed, variable or determined time period between the time at which the discharged water is first collected and a time at which the concentration of soft water ions 132 falls or is expected to have fallen below a minimum threshold.

FIG. 11 is a flowchart that outlines one or more examples of embodiments of a method of water reclamation according to this invention. The example method of water reclamation shown in FIG. 11 may be particularly useful to reclaim discharge water that has a high concentration of soil water ions as a current and/or future brine source. As shown in FIG. 11, the example method of water reclamation begins in step S100, and continues to step S110, where the cation exchange water softener starts a first or next portion or phase of the regeneration cycle. Operation then continues to step S120.

In a regeneration cycle, the cation exchange water softener is provided with raw hard water during a backwash phase, during a slow rinse phase and/or during a fast rinse phase, and is provided with a regenerant solution during a regenerant solution phase. The raw hard water and the regenerant solution pass over and/or around the resin beads and are discharged. As outlined above, at certain times within the regeneration cycle, such as during portions of the backwash phase and/or during initial portions of the regenerant solution phase, the discharged water has a relatively high concentration of hard water ions and/or is otherwise unsuitable for reclaiming or recapturing. At other times within the regeneration cycle, the discharged water has a relatively high concentration of soft water ions and/or is otherwise suitable for reclaiming or recapturing.

Accordingly, in step S120, a determination is made whether it is desirable to begin reclaiming the discharged water, such as for current and/or later secondary uses, such as, for example, use as a brine source. If it is not yet desirable for the discharged water to be reclaimed, operation jumps to step S140, where the discharged water is directed to the drain or sewer line. Operation then continues from step S140 to step S150. Otherwise, operation continues to step S130.

In step S130, the discharged water is recaptured as grey water or the like, is reclaimed as reclaimable regenerant solution, or is recaptured for some other appropriate use or purpose. That is, the discharged water is redirected toward one of a variety of storage tanks or containers and the like. The storage tank may be the original regenerant solution generating tank or may be a secondary storage tank for storing the regenerant solution, grey water or any other type of recaptured or reclaimed discharged water. Alternatively, the reclaimable regenerant solution may be cycled back (directly or indirectly) to the cation exchange water softener, in place of fresh or unused regenerant solution. In any case, the discharged water may be reclaimed for a current and/or later use. Operation then jumps from step S130 to step S150.

In step S150, a determination is made whether the current phase of the regeneration cycle has finished. If so, operation continues to step S160. Otherwise, operation jumps back to step S120. In step S160, a determination is made whether the current phase of the regeneration cycle is the last phase. If so, operation continues to step S170. Otherwise, operation jumps back to step S110, where the next phase of the regeneration cycle is initiated. In step S170, since the last phase of the regeneration cycle has finished, meaning that the regeneration cycle itself has finished, the water conditioner controller sets the valves between the raw hard water supply tube, the regenerant supply tube, the discharge tube and the soft water distribution tube into position to supply softened water to the soft water distribution system. Operation then continues to step S180, where operation of the method ends.

It should be appreciated that the determination made in step S120 may be made by any suitable known or later-developed method and may be different depending on the desired current or future use of the water solution. In various examples of embodiments, a timer indicates how long the regeneration cycle or the current phase of the regeneration cycle has been running or how much time the regeneration cycle or the current phase has remaining. In such examples of embodiments, after a given amount of time, it may be assumed that the quality of the discharged water is such that it is appropriate to reclaim or recapture the discharged water, such as when the discharge water has a suitably high concentration of soft water ions and thus is desirably reclaimed as a current or future source of regenerant solution.

In various other examples of embodiments, one or more sensors may be provided that determine the actual quality of the discharged water, such as its clarity, the concentration of soft water ions in the discharged water, the concentration of hard water ions in the discharged water, and/or any other appropriate parameter or criteria or characteristic. For example, when the actual concentration of soft water ions reaches a defined or selected threshold, it is desirable to reclaim or recapture the discharged water as a future source of regenerant solution. In general, any suitable known or later-developed method or device that is usable to determine the relative, actual or expected concentration of soft water ions, the relative, actual or expected concentration of hard water ions, the relative, actual or expected ratio of soft water ions to hard water ions in, and/or the turbidity, the clarity or any other quality of, the discharged water may be usable to determine whether it is desirable to collect that discharged water for a particular purpose.

It should be appreciated that the determination made in step S140 may be made by any suitable known or later-developed method. In various examples of embodiments, a timer indicates how long the discharged water has been directed to the storage tank. In such examples of embodiments, after a given time period, it may be assumed that the discharged water no longer has a suitably high concentration of soft water ions for the discharged water to be reclaimed for current and/or later use as a source of regenerant solution. In various other examples of embodiments, one or more sensors may be provided that determine the actual quality of the discharged water, such as its clarity, the concentration of soft water ions in the discharged water, the concentration of hard water ions in the discharged water, and/or any other appropriate parameter or criteria or characteristic. When the actual concentration of soft water ions falls below a defined or selected threshold, it is no longer desirable to collect the discharged water as reclaimed regenerant solution. In general, any suitable known or later-developed method or device that is usable to determine the relative, actual or expected concentration of soft water ions, the relative, actual or expected concentration of hard water ions, the relative, actual or expected ratio of soft water ions to hard water ions in, and/or the turbidity, the clarity or any other quality of, the discharged water may be usable to determine whether it is still desirable to collect that discharged water.

It should be appreciated that the above-outlined method may be changed slightly depending on the type of water desirably reclaimed (e.g., depending on the intended secondary use of the reclaimed water). For example, if the secondary use of the reclaimed water is a grey water use, the discharged water may be reclaimed when soft water ion concentration is relatively low and may be directed to the drain or sewer line during other portions of the regeneration cycle, such as when the hard water ion concentration is relatively high. Again, this determination may be determined by any known or later-developed method or device. Likewise, the method may be altered to allow for grey water, regenerant solution and/or other water reclamation during different desirable time periods of the same regeneration cycle.

FIG. 12 shows one or more examples of embodiments of a water discharge management system 200 usable to reclaim one or more types of water and/or portions of the regenerant solution during a typical regeneration cycle of a cation exchange water softener 220. As shown in FIG. 2, the water discharge management system 200 includes a regenerant solution supply or generating tank or container 210, the cation exchange water softener 220, a first three-way valve 230, a second three-way valve 240, a potable water storage tank or container 250, a third three-way valve 260, a grey water storage tank or container 270 and a reclaimed regenerant solution tube 264 that connects the third three-way valve 260 to the regenerant solution supply or generating tank 210. The regenerant solution supply or generating tank or container 210 stores a regenerant solution that is saturated with soft water ions. A regenerant solution supply tube 212 connects an outlet of the regenerant solution supply or generating tank 210 and an inlet of the cation exchange water softener 220. A discharge tube 226 connects the discharge outlet of the cation exchange water softener 220 and an inlet of the first three way valve 230.

During various portions of the example regeneration cycle, raw hard water and the regenerant solution from the regenerant solution supply tank 210 are variously provided to the cation exchange water softener 220 through a raw water supply tube 222 and the regenerant solution supply tube 212. The discharge water discharged from the cation exchange water softener 220 is then provided to the first three-way valve 230 via the discharge tube 226. The first three-way valve 230 controllably and selectively directs the discharge water either to a waste tube 232 or to a first reclaim tube 234. The waste tube 232 conveys the discharge water to a drain or sewer line or the like. In contrast, the first reclaim tube 234 directs the discharge water to the second three-way valve 240. The first three-way valve 230 may be used to direct the discharge water to the waste tube 232 during periods in which the discharge water has an undesirable or unusable concentration of soft water ions and/or an undesirable or unusable concentration of hard water ions. Likewise, the first three-way valve 230 may be used to direct the discharge water to the reclaim tube 234 during periods in which the discharge water has a desirable or usable concentration of soft water ions and/or a desirable or usable concentration of hard water ions.

The first reclaim tube 234 is connected to an inlet of the second three-way valve 240. The second three-way valve 240 may be usable to controllably and selectively direct the reclaimable discharge water either to a potable water storage tank 250 or to a third three-way valve 260. The second three-way valve 240 connects the first reclaim tube 234 to the potable water storage tank 250 through a tube 242 whenever a determination is made that the reclaimed discharge water may be appropriately useable as a source of potable water. In contrast, the second three-way valve 240 connects the first reclaim tube 234 to the third three-way valve 260 through a second reclaim tube 244. The third three-way valve 260 may be usable to controllably and selectively direct either the reclaimable discharge water 116 to a grey water storage tank or container 270, via a tube 262, or the reclaimed regenerant solution 114 to the regenerant solution supply or generating tank 210, via a third reclaim tube 264. That is, the third three-way valve 260 connects the second reclaim tube 244 either to the grey water storage tank 270 through the grey water tube 262 or to the regenerant solution supply or generating tank 210 through the third reclaim tube 264. The third three-way valve 260 directs the discharged and reclaimed discharge water 116 to the grey water tank 270 when the discharged water has a suitable concentration of soft water ions and/or hard water ions for grey water use (e.g., a low concentration of soft water ions and/or a high concentration of hard water ions). The third three-way valve 260 directs the discharged and reclaimed regenerant solution 114 to the regenerant solution supply or generating tank 210 when the reclaimed regenerant solution 114 has a suitable concentration of soft water ions and/or hard water ions (e.g., a high concentration of soft water ions and/or a low concentration of hard water ions).

It should be appreciated that the discharge water 116 that has been directed to, and stored in, the grey water storage tank 270 and/or the potable water storage tank 250 can be (optionally) treated, pressurized and reused for potable and/or non-potable uses (such as, for example, flushing toilets, watering plants and lawns, etc.). It should also be appreciated that, in various other examples of embodiments that the third reclaim tube 264, rather than connecting third three-way valve 260 to the regenerant solution supply or generating tank 210, instead conveys the reclaimed regenerant solution 114 to a secondary regenerant solution storage tank or container for storage and/or later use. In such examples of embodiments, the fresh, original or unused regenerant solution 112 stored in the regenerant solution supply or generating tank 210 does not mix with the reclaimed regenerant solution 114, which could dilute, contaminate or otherwise alter the fresh, original or unused regenerant solution 112 stored in the regenerant solution supply or generating tank 210.

It should further be appreciated that, in various other examples of embodiments, rather than connecting the third three-way valve 260 directly to the brine source tank 210 via the third reclaim tube 264, the outlet from the third three-way valve 260 is connected to a resupply tube 280 (shown in shadow in FIG. 12) that conveys the discharged and reclaimed regenerant solution 114 directly back to the regenerant solution source tube 212, such that the reclaimed regenerant solution 114 flows into the cation exchange water softener 220 in place of original, unused or fresh regenerant solution 112 from the regenerant solution supply or generating tank 210. Furthermore, in some examples of embodiments, a fourth three-way (not shown) could be used to controllably or selectively connect the outlet from the third three-way valve 260 to the tubes 264 and 280.

In the example embodiment shown in FIG. 12, three distinct types of discharged water are recaptured or reclaimed. It should be appreciated that if only one or two types of discharged water are desirably reclaimed (such as, for example, if only the regenerant solution 114 and/or only portions of discharged grey water 116 is desired for reclamation), then the second and/or third three-way valves 240 and/or 260 may be omitted. For example, in many installations, it may be too expensive to use recaptured portions of the discharge water as potable water due to such factors as any required post-capture treatments, the volume of the portions that can ultimately be usable as potable water, return on the additional investment in the three-way valve 240, the additional storage tank(s), the additional plumbing and the like. In such installations, the second three-way valve 240, the storage tank 250 and the connecting tube 242 may be omitted, with the tube 234 instead connected directly to the third three-way valve 260.

In other installations, both the second and third three-way valves 240 and 260, and their attendant storage tanks 250 and 270, may be omitted along with the various one of the tubes 242, 244, 262 and/or 280. In such installations, the tube 234 conveys the reclaimed discharge water to the desired storage tank or back to the cation exchange water softener 220 for re-use, depending on the type of discharge water that is recaptured or reclaimed.

It should he appreciated that, in various examples of embodiments, the water discharge management system 200 may be used to reclaim or recapture all of the discharge water discharged during the regeneration cycle and/or to separate the discharge water into more than the 4 types (waste, grey and potable water and regenerant solution) discussed above. In such examples of embodiments, three, four or more motorized three-way valves may be connected in a series configuration (as shown in FIG. 12) or in a tree configuration. It should additionally be appreciated that, as discussed above with respect to FIG. 10, in various examples of embodiments, the discharged water may be captured or reclaimed for each of one or more different uses over one or more different portions of the regeneration cycle. In such examples of embodiments, each implemented three-way valve, such as the first-third three-way valves 230, 240 and 260, may be configured and controllably operated to direct the discharged water to a first tank for one use during one or more different time periods and to a second tank for another use during the remaining time periods, to a first tank for one use during one or more time periods and another three-way valve during the remaining time periods or to one three-way valve during one or more time periods and another three-way valve during the remaining time periods.

Thus, as discussed above, it should be appreciated that any number or type of three-way valves may be provided in the water discharge management system 200 and can be connected in any appropriate configuration, such as in a cascaded manner or in a tree structure, to direct the discharged water to any number of storage tanks. Further, while three-way valves are specifically described for the examples of embodiments discussed herein, any multi-way valve would be acceptable for the purposes provided. For example, it should also be appreciated that any two three-way valves may be replaced with a single suitable four-way valve that controllably and selectively connects the input tube to three output tubes. Furthermore, all of the three- or more- way valves may be replaced with a single controllably operable manifold having a suitable number of ports that can be controllably opened and shut as desired. For example, in the example embodiment shown in FIG. 12, the second and third three-way valves 240 and 260 could be replaced with a single 4-way valve connected between the tube 234 and the tubes 242, 262 and 264 (and/or 280) or all three three-way valves could be replaced with a manifold connected between the tube 226 and the tubes 232, 242, 262 and 264 (and/or 280). Additionally, any one three-way valve may be replaced with a pair of two-way valves.

It should be appreciated that the various types of controllably operable two-way valves, 3-, 4- and more-way valves and/or manifolds, such as the first-third three-way valves 230, 240 and 260, may be implemented using any suitable known or later-developed valve type or structure. Likewise, the valves may be any suitable valve, including but not limited to, motorized, solenoid valves, flapper valves, ball valves, and the like.

In various examples of embodiments, the first-third three-way valves 230, 240 and 260 are desirably implemented using three-way motorized alternating valves (MAVs), such as that available from Clack Corporation of Windsor, Wis. In various examples of embodiments, a single controller can be used to control one, two or even all three of the first-third three-way valves 230, 240 and 260, as well as to control and implement the regeneration cycle of the cation exchange water softener 220. While a particular example of a controller is described herein, any suitable controller adapted to accomplish the purposes provided may be acceptable for use with the water discharge management system.

The motorized alternating valves are especially useful in low-cost residential and light-commercial water softening systems, as they omit relays and other high cost electronics, which significantly reduces their cost and simplifies their connection to the controller. In particular, the motorized alternating valves are each connected to the controller using a single pair of wires or signal paths. That is, in contrast to conventional controllable valves, which use mechanical relays, electronic power transistors or the like, to control the direction the valve is operated in, the motorized alternating valves operate based on the polarity of the drive signal provided to that pair of wires by the controller. Thus, to drive a motorized alternating valve first in one direction and then in the opposite direction, the controller merely first connects a first one of the pair of wires to ground and places the drive signal on the second wire, and then connects the second wire to ground and places the drive signal on the first wire.

Similarly, in contrast to conventional controllable valves, which use limit switches or the like to detect when the valve has reached its end of travel and thus no longer needs to be driven, the motorized alternating valve merely provides a substantially increased load when the valve reaches one end of its travel. This substantially increased load results in the motorized alternating valve drawing a substantially increased amount of current, which can be sensed or detected by appropriate circuitry added to the controller. Thus, when the controller detects or senses that the amount of current drawn by a particular motorized alternating valve over the single pair of wires has increased, the controller merely removes the drive signal from that pair of wires to de-energize that motorized alternating valve.

It should also be appreciated that, rather than physically wiring the motorized alternating valves to the controller, in some examples of embodiments, the controller outputs one or more wireless signals to one or more of the motorized alternating valves. Wireless on-board controllers that receive those signals then place the appropriate drive signals having the appropriate polarity on those one or more motorized alternating valves. Each of those wireless on-board controllers also takes over sensing when the current drawn by the corresponding motorized alternating valve increases and removing the drive signal from that corresponding motorized alternating valve in response.

In operation, when the motorized alternating valve is to be altered from its first position, where it connects the input line to a first output line, such as the tubes 232, 242 or 262, to its second position, where it connects the input line to a second output line, such as the tubes 234, 244 or 264, the controller connects the appropriate one of the pair of wires or signal lines for that valve to the drive signal and connects the other one of the pair of wires or signal lines for that valve to ground. As a result, the motorized alternating valve rotates away from the first position and toward the second position.

At the same time, the controller monitors the current drawn by that motorized alternating valve. When the motorized alternating valve reaches the second position, a stop prevents it from rotating further. The motor of the motorized alternating valve sees this as an increased load, and thus draws additional current. This additional current drawn by that motorized alternating valve is sensed by the controller, which interprets the increase in the current draw as indicating the motorized alternating valve is now in the second position. Accordingly, the controller removes the drive signal from the appropriate one of the pair of wires or drive signal lines.

To reverse the motorized alternating valve and move it from the second position to the first position, the controller places the drive signal on the other one of the pair of wires or signal lines and the ground signal on the first one of the pair of wires or signal lines and waits for the current drawn by the motorized alternating valve to again increase.

In various examples of embodiments, each of the three-way valves is connected to the controller, which controls the operation of the three-way valves based on how the discharge water currently being output from the cation exchange water softener 220 is to be handled. It should be appreciated that the three-way valve can be connected to the controller using any known or later developed communication protocol. For example, in various examples of embodiments, the pair or wires or signal lines from each three-way valves is connected to a separate port on the controller. The controller operates the motor of a given three-way valve by providing the drive and ground signals to the corresponding port in the appropriate polarity to move the motor of that three-way valve in the desired direction. In various other examples of embodiments, a single bus (such as, for example, a parallel or serial bus) connects the pairs of wires or signal lines for all of the three-way valves to the controller. In such examples of embodiments, each three-way valve responds to a different signal on the bus (e.g., through identification signals or separate communications lines on the bus). In yet other examples of embodiments, each three-way valve communicates with the controller using a wireless communications protocol.

Thus, as outlined above, the first-third three-way valves 230, 240 and 260 do not use or require switches to determine the present position of the valve (e.g., open, closed, or in between). The controller controlling the first-third three-way valves 230, 240 and 260 monitors the amounts of electrical current drawn by the first-third three-way valves 230, 240 and 260. When the motor for a given valve has reached an end of travel, such that that valve has fully moved to the first or second position and thus should be stopped, the amount of current drawn by that valve increases sharply. The controller, which monitors the amount of current drawn by that valve, senses or detects the increased amount of current drawn by that valve, which it treats as the signal to de-energize that valve. Additionally, in various examples of embodiments, the controller includes a timer that tracks the amount of time between the motor being initialed and when it reaches an end of travel. This timing feature can be used to detect errors or faults in the value, as it indicates if the motor takes too much time to reach the expected end of travel. The excess amount of time and the direction the valve was traveling in may provide information that allows the faulty valve to be diagnosed.

It should he appreciated that, in various other examples of embodiments, rather than sensing the current draw, the three-way valves may each include an optical counter to determine when the three-way valve has reached the end of its travel in a particular direction. This is similar to the techniques used on the control valve, and allows the controller to operate the three-way valves independently and without having to be limited to sensing the current draw.

It should be appreciated that the water discharge management system 200 may additionally include one or more three-way valves upstream of the cation exchange water softener 220. For example, the water discharge management system 200 may include a three-way valve on the raw water supply tube 222 between the raw hard water supply and the cation exchange water softener 220. This additional three-way valve can be used to controllably and selectively connect the inlet of the cation exchange water softener 220 to the raw hard water supply (e.g., a well or a utility main line) or a secondary source of water used for regeneration purposes only (such as, for example, a supply of previously softened water that is used in place of the raw hard water during the backwash and slow and fax rinse phases).

Likewise, two water discharge management systems 200, or two cation exchange water softeners 220, may be connected in parallel, series or alternating controllably and selectively connected to the downstream soft water distribution system by yet another three-way valve. In such examples of embodiments, one water discharge management system 200 or one cation exchange water softener 220 may be active while the other water discharge management system 200 or other cation exchange water softener 220 is in a stand-by mode or undergoing a regeneration cycle. In another example, the water discharge management systems 200 may be connected in parallel operating as a demand recall system and/or stage by flow. In such examples, all units may be in service at the same time, or may bring additional unit(s) on line as the gpm flow rate increases and consequently drop unit(s) off line as the flow rate decreases. In any of the foregoing examples of embodiments, any additional three-way valves upstream of the cation exchange water softener 220 may be controlled by the same controller as the regeneration cycle of the cation exchange water softener 220 and/or by the same controller as any three-way valves that are downstream of the cation exchange water softener 220 (e.g., the first-third three-way valves 230, 240 and 260).

While specific examples are provided herein, one of skill in the art would understand the water management system herein may be used to reclaim some or all of the waste water from various filtration systems. For example, some or all of the waste stream from a carbon filter system used to remove chlorine from the water supply could be reclaimed and used for example as a water supply source for certain applications. It is understood that various other types of filters and various other types of reclaim purpose may he substituted in place of the systems described.

The water discharge management systems and methods described herein provide various advantages over existing devices. For example, the system and method permit a reduction in the volume of the salt water or brine solution used during the regeneration cycle will result in a corresponding reduction in the amount of sodium salt purchased by the end user. Likewise, a reduction in the volume of the salt water or brine solution used in the regeneration cycle will result in a reduction in the amount of sodium salt released into the local environment. Reducing the amount of sodium salt released into the local environment may have significant positive environmental implications.

In locations and/or times of particular water scarcity, it may be desirable to conserve as much water as possible. As such, it may be desirable to reclaim any water that is discharged from the cation exchange water softener when that water has additional usability. That is, if the water discharged from the cation exchange water softener, at any point during the regeneration cycle, can be used for other purposes (e.g., as a salt water or brine solution, as grey (e.g., non-potable) water, as potable water, etc), that discharged water may be reclaimed for current or future use. The disclosed water discharge management system advantageously provides systems, methods and/or apparatuses that are usable to reduce the amount of water and/or salt used during a regeneration cycle of a cation exchange water softener. One or more examples of embodiments of systems, methods and/or apparatus according to this invention may be usable to reclaim water that has been discharged during the regeneration cycle of the cation exchange water softener When the discharged water has a high concentration of soft water ions (e.g., so called "sweet brine"). This reclaimed water, with its high concentration of soft water ions, can be used during the same and/or subsequent regeneration cycles, as a source of soft water ions.

The disclosed water discharge management system also advantageously limits the amount of water waste by reclaiming water that can be used for one or more other purposes, One or more examples of embodiments of systems, methods and/ or apparatus according to this invention may be usable to reclaim water discharged during the regeneration cycle which water can be used for current and/or future purposes (e.g., grey water usable in non-potable situations, etc).

This water discharge management system described herein separately provides one or more three-way valves for alternatively directing water that has been discharged during a regeneration cycle to either a waste line or one or more reclamation lines. This system also separately provides systems, apparatus and methods that return water that has been discharged during a regeneration cycle of a cation exchange water softener to a salt water/brine solution source tank when the discharged water has a sufficiently high concentration of dissolved soft water ions. This system separately provides systems, apparatus and methods that return water that has been discharged during a regeneration cycle of a cation exchange water softener to a grey water source tank when the discharged water has a sufficiently low concentration of dissolved soft water ions. This system separately provides systems, apparatus and methods for determining whether water being discharged during a regeneration cycle of a cation exchange water softener should be reclaimed or discarded. This system separately provides control devices usable to determine whether water being discharged during a regeneration cycle of a cation exchange water softener should be reclaimed or discarded. This system separately provides systems, apparatus and methods for reclaiming water that has been discharged during desirable and/or selected time periods of a regeneration cycle of a cation exchange water softener and discarding water that has been discharged during undesirable and/or unselected time periods of the regeneration cycle.

As utilized herein, the terms "approximately," "about," "substantially," and similar terms are intended to have abroad meaning in harmony with the common and accepted usage by those of ordinary skill in the art to which the subject matter of this disclosure pertains. It should be understood by those of skill in the art that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top", "bottom", "side", "left", "right") in this description are merely used to identify various elements as are oriented in the Figures. It should he recognized that the orientation of particular components may vary greatly depending on the application in which they are used.

For the purpose of this disclosure, the term "coupled" and the term "connected" mean the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is important to note that the construction and arrangement of water softener system and the water discharge management system as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may he integrally formed, the operation of the interfaces may be reversed or otherwise varied, the length or width of the structures and/or members or connector or other elements of the system may be varied, the nature or number of adjustment positions provided between the elements may be varied (e.g., by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present invention.

The invention claimed is:

1. A method of water discharge management in a water processing system comprising:
providing a supply of a first solution;
providing a supply of a second solution;
selectively supplying the first solution to a water processing system and the second solution to the water processing system;
discharging a discharge water from the water processing system; and
implementing a reclamation protocol comprising:
controllably and selectively directing the discharge water from the water processing system directly through a first multi-way valve to a waste outlet during a period in which the discharge water satisfies a first selected criteria, and to a second multi-way valve during a period in which the discharge water satisfies a second selected criteria;
controllably and selectively directing the discharge water received from the first multi-way valve through the second multi-way valve to a first tube during a period in which the discharge water does not satisfy a third criteria, or to a second tube fluidly coupled to a regenerant solution storage container during a period in which the discharge water satisfies the third selected criteria; and
controllably and selectively directing the discharge water from the waste outlet through an external drain line, wherein the discharge water in the external drain line comprises non-recaptured turbid liquid waste;
wherein the first multi-way valve and the second multi-way valve are controlled by the water processing system which also controls and implements a regeneration cycle of the water processing system and the reclamation protocol;
wherein the second selected criteria and the third selected criteria are each selected from the group consisting of a concentration of soft water ions, a concentration of hard water ions, a ratio of soft water ions to hard water ions, turbidity of the discharged water, and clarity of the discharged water; and
wherein the second selected criteria and the third selected criteria are different selected criteria from the group.

2. The method of claim 1, wherein the first solution supply is a supply of a regenerant solution having soft water ions.

3. The method of claim 1, wherein the second solution supply is a supply of raw hard water having hard water ions.

4. The method of claim 1, wherein the water processing system is selected from the group consisting of a water conditioning system, an ion exchange system, and a filtration system.

5. The method of claim 1, wherein the water processing system is selected from the group consisting of a water conditioning unit, a cation exchange system, an anion exchange system, a water filtration system, pH filter, acid neutralizer, carbon filtration system, taste filter, odor filter, multi-media filter, ag filter, birm filter, iron filter, hydrogen sulfide filter, sand filter, and particulate filter.

6. The method of claim 1, further comprising controllably and selectively directing the discharge water through the second multi-way valve to a grey water storage container during a period in which the discharge water satisfies a fourth selected criteria selected from the group consisting of a concentration of soft water ions, a concentration of hard water ions, a ratio of soft water ions to hard water ions, turbidity of the discharged water, and clarity of the discharged water, wherein the fourth selected criteria is different from the second selected criteria and the third selected criteria.

7. The method of claim 1, wherein the first selected criteria is selected from the group consisting of a concentration of soft water ions, a concentration of hard water ions, a ratio of soft water ions to hard water ions, turbidity of the discharged water, and clarity of the discharged water, and the first selected criteria is different from the second selected criteria and the third selected criteria.

8. The method of claim 6, wherein the fourth selected criteria is selected from the group consisting of a low concentration of soft water ions and high concentration of hard water ions.

9. The method of claim 1, wherein the third selected criteria is selected from a group consisting of a high concentration of soft water ions and a low concentration of hard water ions.

10. The method of claim 1, wherein the supply of first solution is stopped while discharged water continues to exit the water processing system during a slow rinse phase.

11. The method of claim 1, wherein the flow rate of second solution from the supply of second solution into the water processing system increases, repacking resin beads of the water processing system during a fast rinse phase, and recapturing the discharge water exiting the water processing system.

12. The method of claim 1, further comprising using a valve controller executing the reclamation protocol to control the first and second multi-way valves and divert the discharge water through the system.

13. The method of claim 12, wherein the valve controller uses a predetermined time period to execute the reclamation protocol.

14. The method of claim 12, wherein the valve controller uses an optical controller to execute the reclamation protocol.

15. The method of claim 12, wherein the valve controller senses current draw to execute the reclamation protocol.

16. The method of claim 12, wherein the valve controller uses a characteristic of the discharge water to execute the reclamation protocol.

17. The method of claim 1, wherein the water processing system comprises an ion exchange medium comprising a bed of resin beads.

18. The method of water discharge management of claim 1, further comprising:
controllably and selectively directing the discharge water received from the first multi-way valve directly through the second multi-way valve to a waste water storage container connected to the second multi-way valve during a period in which the discharge water satisfies a fourth selected criteria, and to a third multi-way valve during a period in which the discharge water satisfies a fifth selected criteria;
wherein the third multi-way valve is controlled by the water processing system.

19. The method of claim 6, wherein the discharge water in the grey water storage container is treated for subsequent use.

* * * * *